United States Patent [19]
Okada et al.

[11] Patent Number: 5,572,374
[45] Date of Patent: Nov. 5, 1996

[54] LENS BARREL

[75] Inventors: Tadanori Okada; Haruhiko Yamanouchi, both of Kanagawa-ken, Japan

[73] Assignee: Canon Kabushiki Kaisha, Tokyo, Japan

[21] Appl. No.: 93,395

[22] Filed: Jul. 19, 1993

[30] Foreign Application Priority Data

Jul. 23, 1992 [JP] Japan .................................. 4-217106

[51] Int. Cl.$^6$ ............... G02B 7/02; G03B 7/00; H05K 1/00
[52] U.S. Cl. .............. 359/827; 359/700; 359/813; 361/749; 396/542
[58] Field of Search ................. 359/694–695, 359/703, 704, 808–830, 896, 700; 354/195.1–195.12, 222, 286, 485, 484, 486; 206/196–199, 316.1–316.2; 361/750, 751, 749

[56] References Cited

U.S. PATENT DOCUMENTS

| | | | |
|---|---|---|---|
| 4,596,454 | 6/1986 | Kawai et al. | 354/485 |
| 4,864,348 | 9/1989 | Fujiwara et al. | 354/485 |
| 4,990,948 | 2/1991 | Sasaki et al. | 354/485 |
| 5,150,145 | 9/1992 | Haraguchi et al. | 354/222 |
| 5,267,088 | 11/1993 | Nomura | 359/819 |

FOREIGN PATENT DOCUMENTS 2231974  11/1990  United Kingdom.
2244567  12/1991  United Kingdom.

*Primary Examiner*—Thong Q. Nguyen
*Attorney, Agent, or Firm*—Robin, Blecker, Daley and Driscoll

[57] ABSTRACT

A lens barrel includes a fixed tube, a moving tube arranged to move in the direction of an optical axis over the outer circumference of the fixed tube and to have a cutout part, and a band-like circuit board disposed around the optical axis on the outside of the fixed tube and having a part located inside the moving tube within an area corresponding to the cutout part and a part located outside the moving tube within an area other than the area corresponding to the cutout part.

27 Claims, 12 Drawing Sheets

(TELEPHOTO END STATE)

FIG. 2 (WIDE-ANGLE END STATE)

LENS BARREL

BACKGROUND OF THE INVENTION

1. Field of the Invention

This invention relates to a lens barrel of the kind having electric elements or the like mounted thereon.

2. Description of the Related Art

The conventional lens barrel of the above-stated kind has been arranged to prevent the mounted electric parts from interfering with a moving tube by arranging them either around a fixed tube which has no moving member near it or on the outside or inside of the moving tube.

The moving tube of the conventional lens barrel is mounted on the fixed tube, which serves as a holding tube, through a mechanism which includes a cam and a cam follower or a helicoid or the like, in such a manner that the moving tube moves a predetermined amount for each amount of operation performed on an operation member.

However, in the case of the conventional lens barrel mentioned above, in arranging the mounted parts within the lens barrel, a circuit board on which the parts are to be mounted must be in a flat (planar) shape where the parts are to be arranged. This requirement tends to cause an unnecessary space between the curved surface of the lens barrel and the flat surface of the mounting circuit board in arranging the mounted parts over the outer circumference of the lens barrel. The unnecessary space necessitates an increase in the outside diameter of the lens barrel by as much as that space. As a result, the size of the lens barrel increases as a whole.

The functions of cameras have recently been diversified to include an automatic focusing function, a power zooming function, etc. The number of actuators such as motors for these functions has increased. The increase in number of actuators makes control circuit arrangement complex to increase the number of parts to be mounted.

Further, the moving tube is sometimes located in the fore end of the lens barrel where a first lens group, a hood, etc., are disposed. In such a case, if an external force is accidentally applied to the lens barrel due to, for example, an incorrect operation by the operator, the external force is received by parts such as the cam and the cam follower or the helicoid that is arranged to serve as a structure for holding the moving tube in a predetermined position. Thus, the external force tends to damage the cam or the cam follower or disengage and damage the helicoid. Further, a force in the falling direction of the lens barrel tends to increase when the moving amount of the moving tube is large. A load imposed on the moving-tube holding structure then becomes larger to damage or deform it or to cause an inadequate movement of the moving tube.

SUMMARY OF THE INVENTION

It is one aspect of this invention to provide a lens barrel which is arranged to have a moving tube inserted in part between a fixed tube and a mounting circuit board, so that the lens barrel can be compactly arranged at a low cost.

The above and other aspects and features of this invention will become apparent from the following detailed description of embodiments thereof taken in connection with the accompanying drawings.

DETAILED DESCRIPTION OF THE PREFERRED EMBODIMENTS

Figure 1:
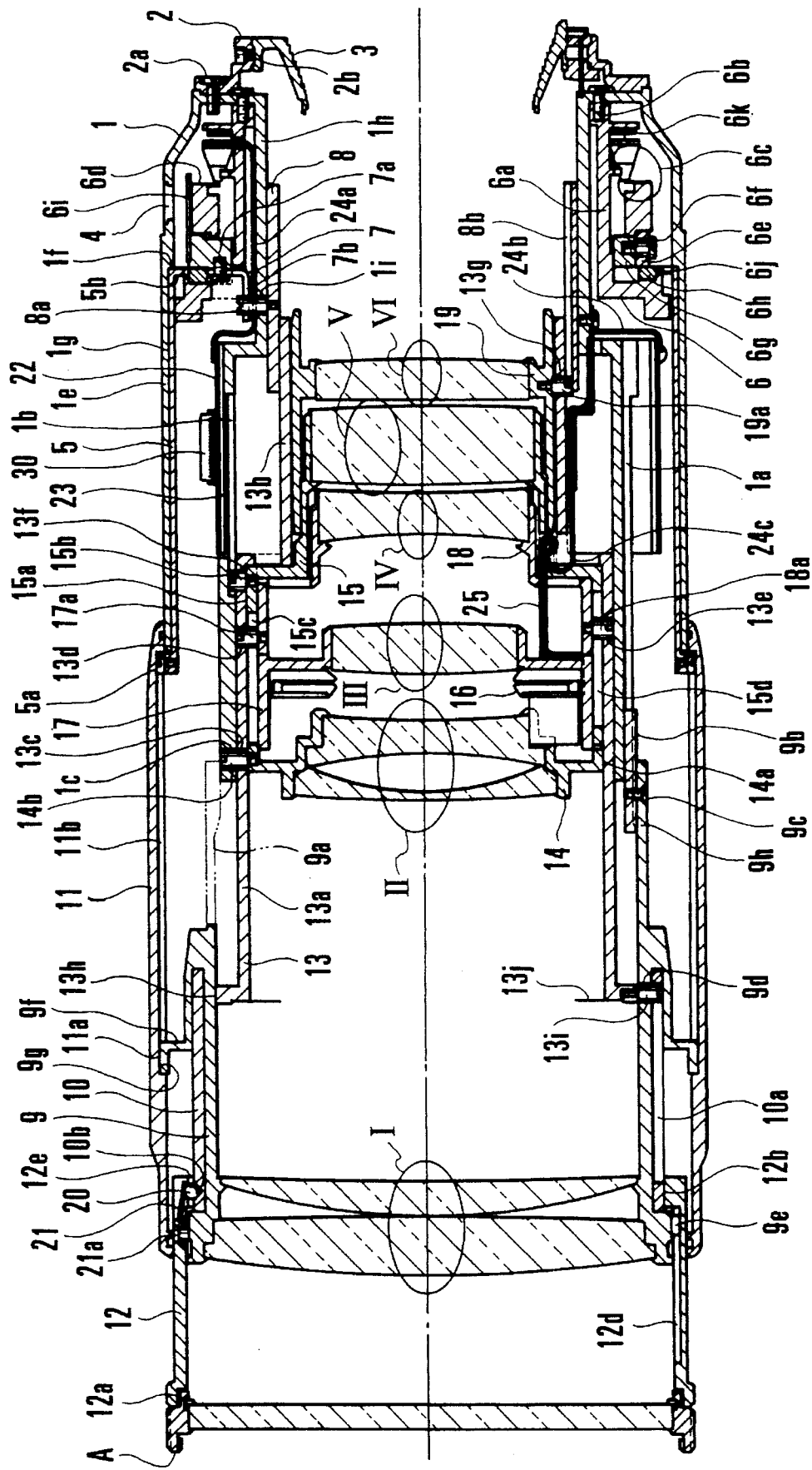
FIG. 1 is a sectional view showing the telephoto end state of a lens barrel arranged according to this invention as an embodiment thereof.
Figure 2:
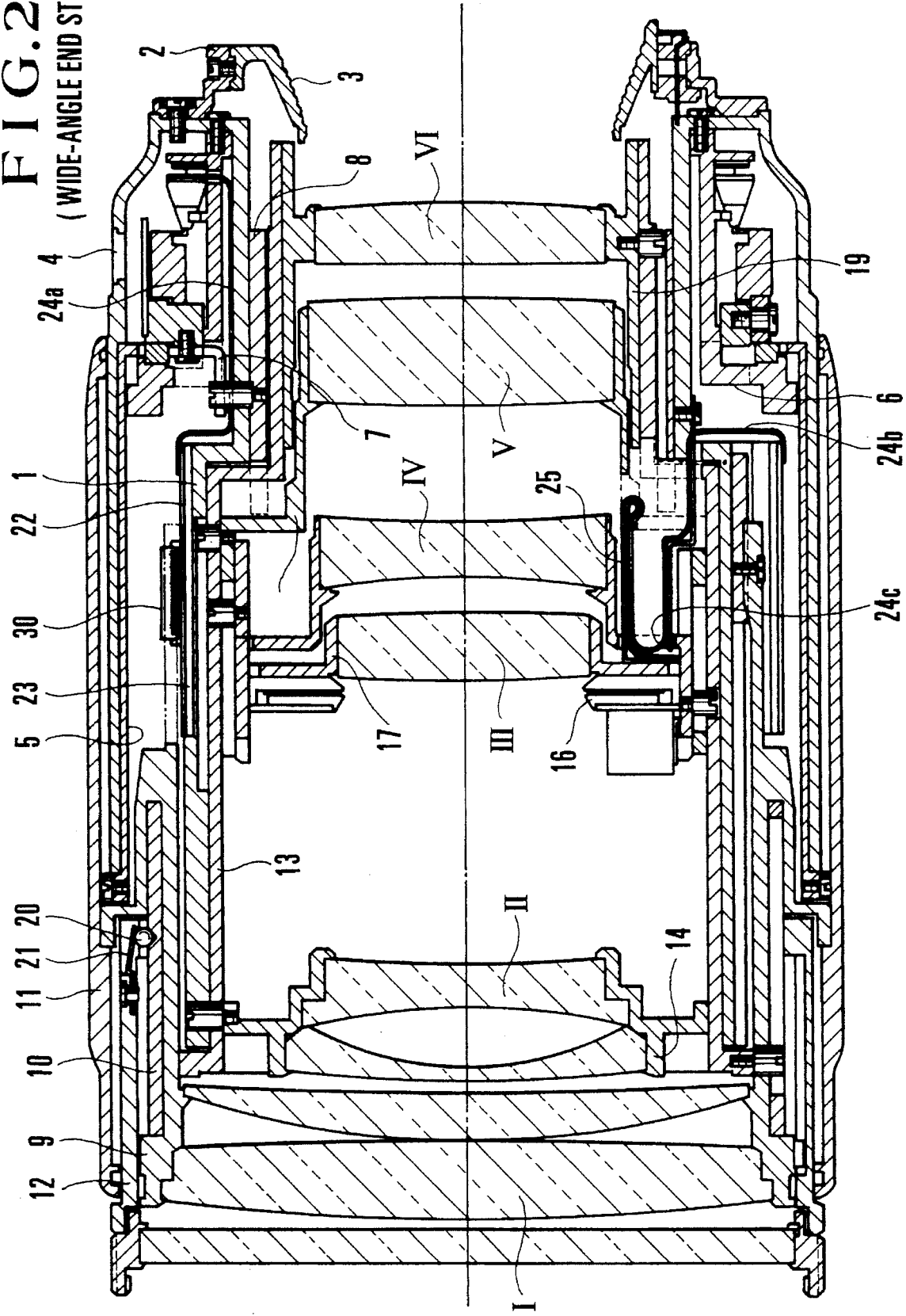
FIG. 2 is a sectional view showing the same lens barrel in a wide-angle end state.
Figure 3:
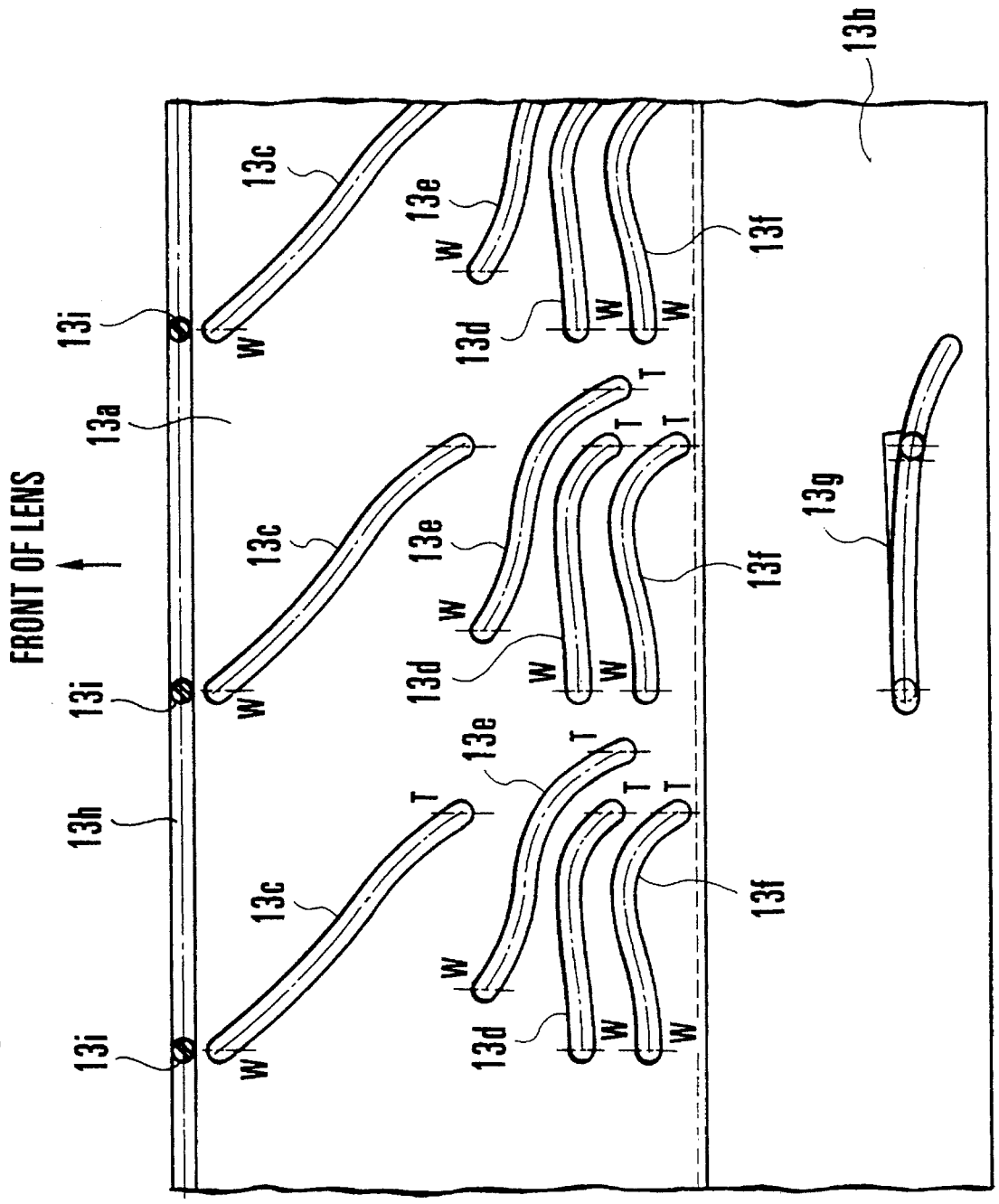
FIG. 3 is a development view showing a cam tube of the embodiment of this invention.
Figure 4:
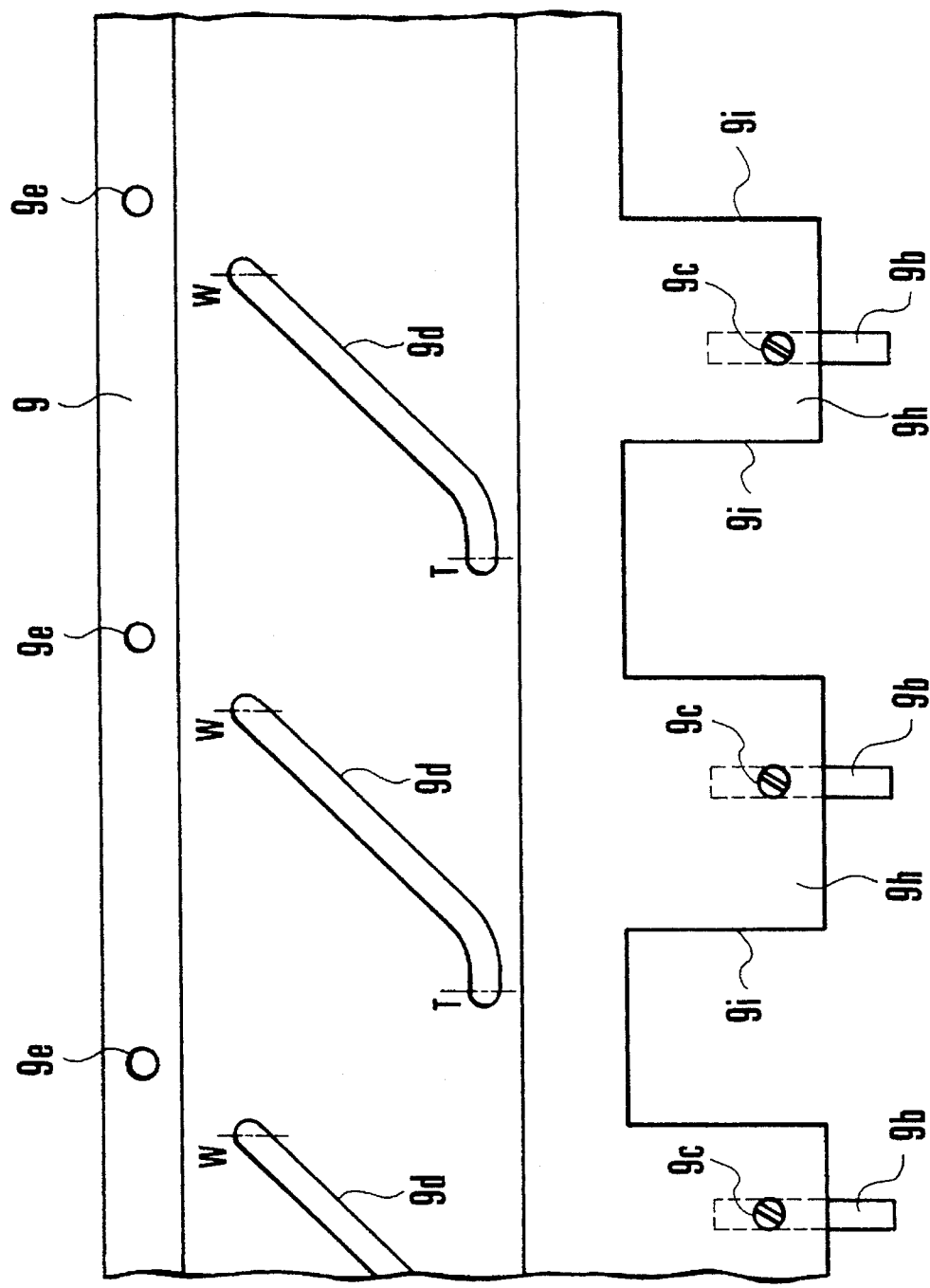
FIG. 4 is a development view showing a first-lens-group tube of the embodiment of this invention.
Figure 5:
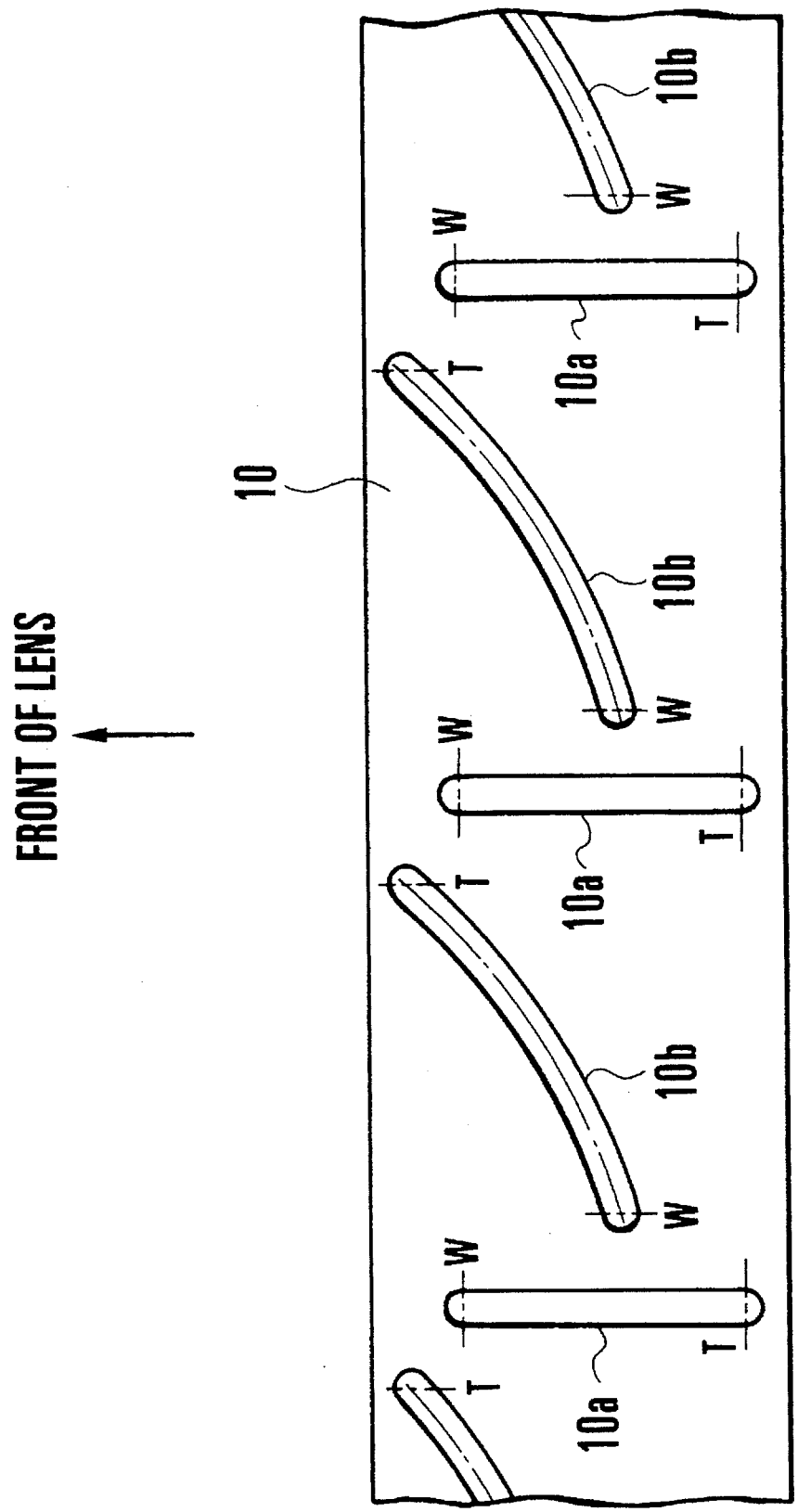
FIG. 5 is a development view showing a cam tube of the embodiment of this invention.
Figure 6:
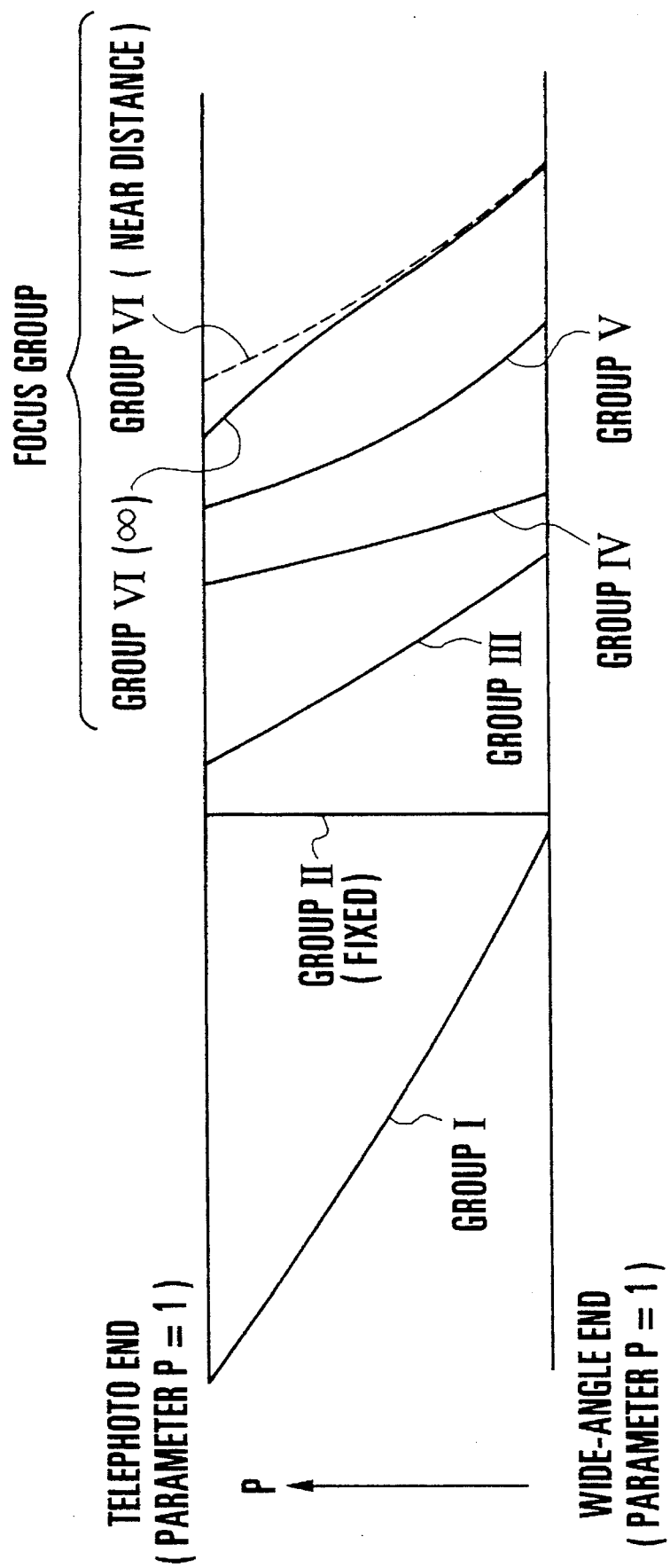
FIG. 6 is a diagram showing a zooming movement of each lens group of the embodiment of this invention.
Figure 7:
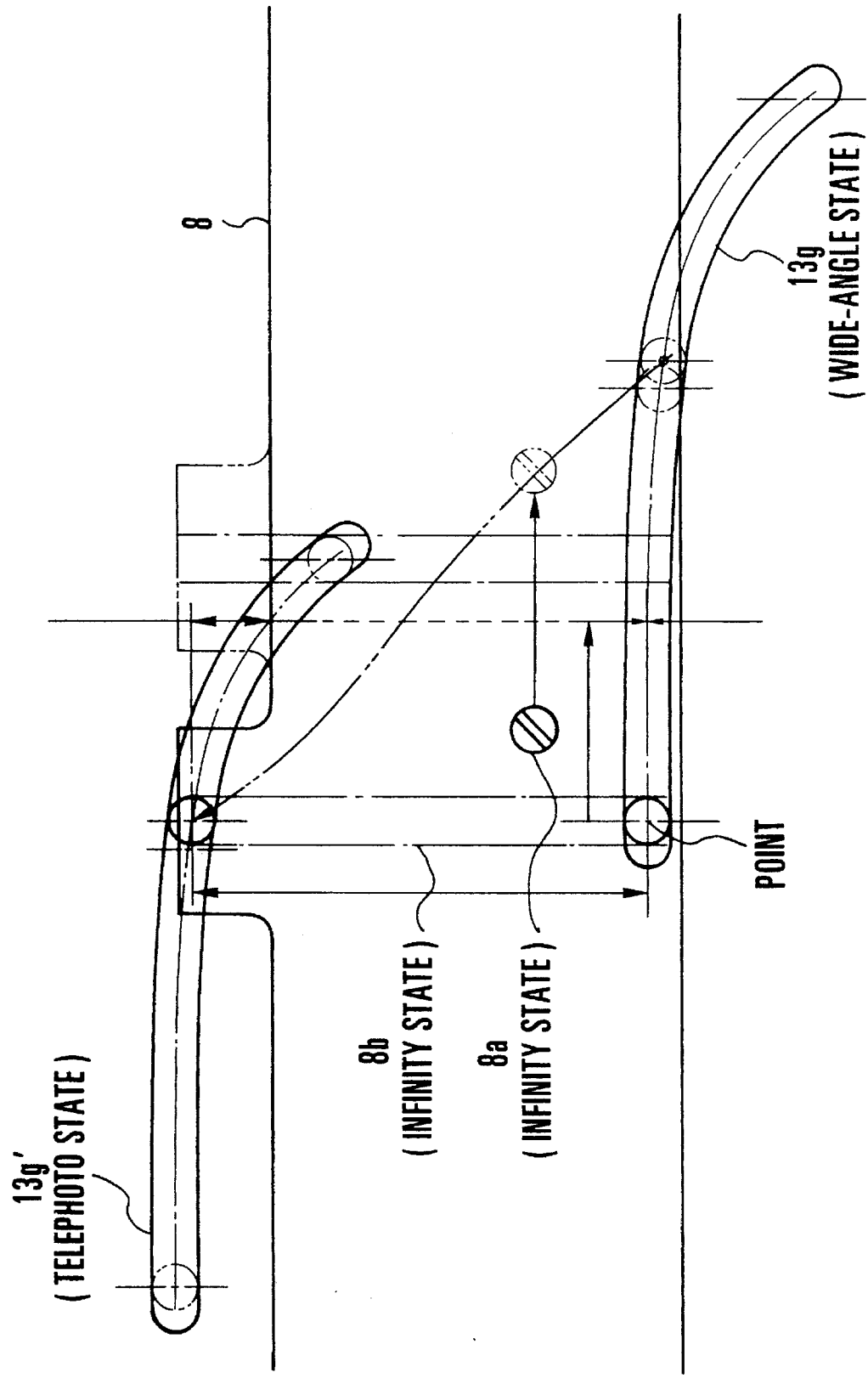
FIG. 7 is a detailed view showing the arrangement of a focus interlocking tube of the embodiment of this invention.
Figure 8:
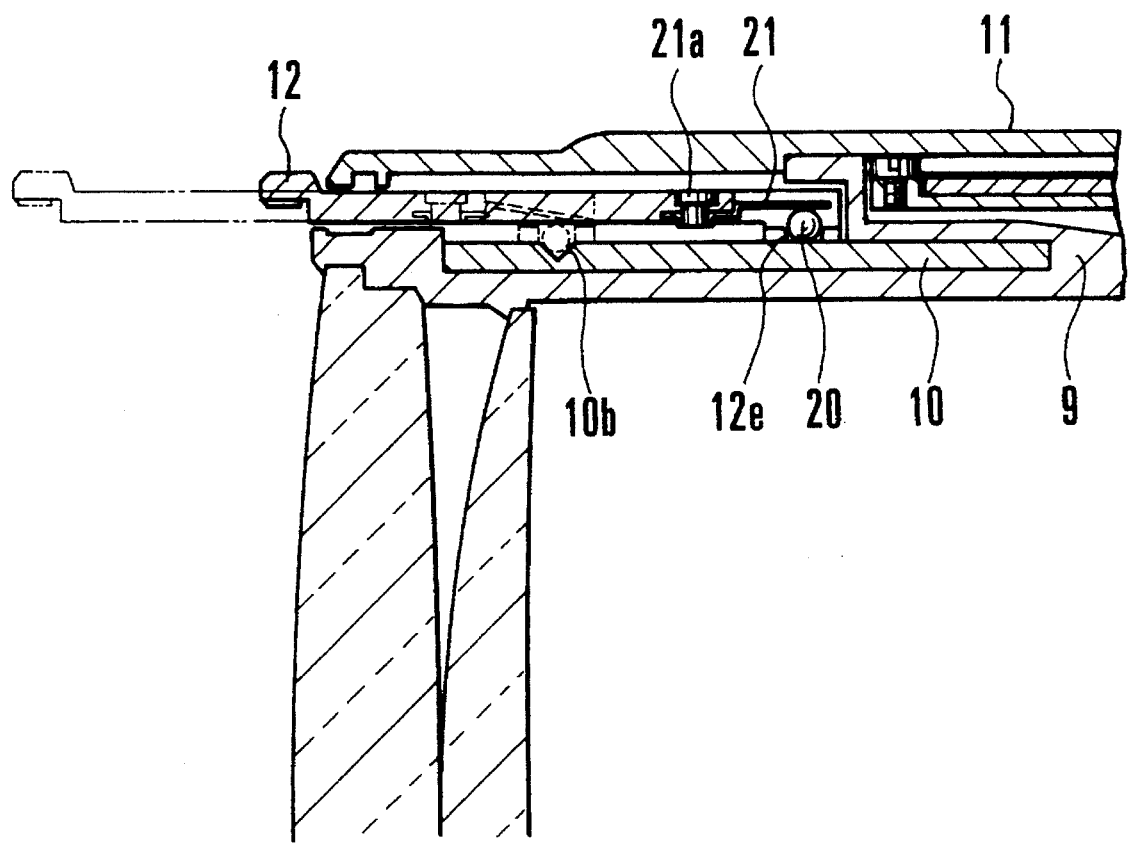
FIG. 8 is a sectional view showing the filter frame mounting part of the embodiment of this invention.
Figure 9:
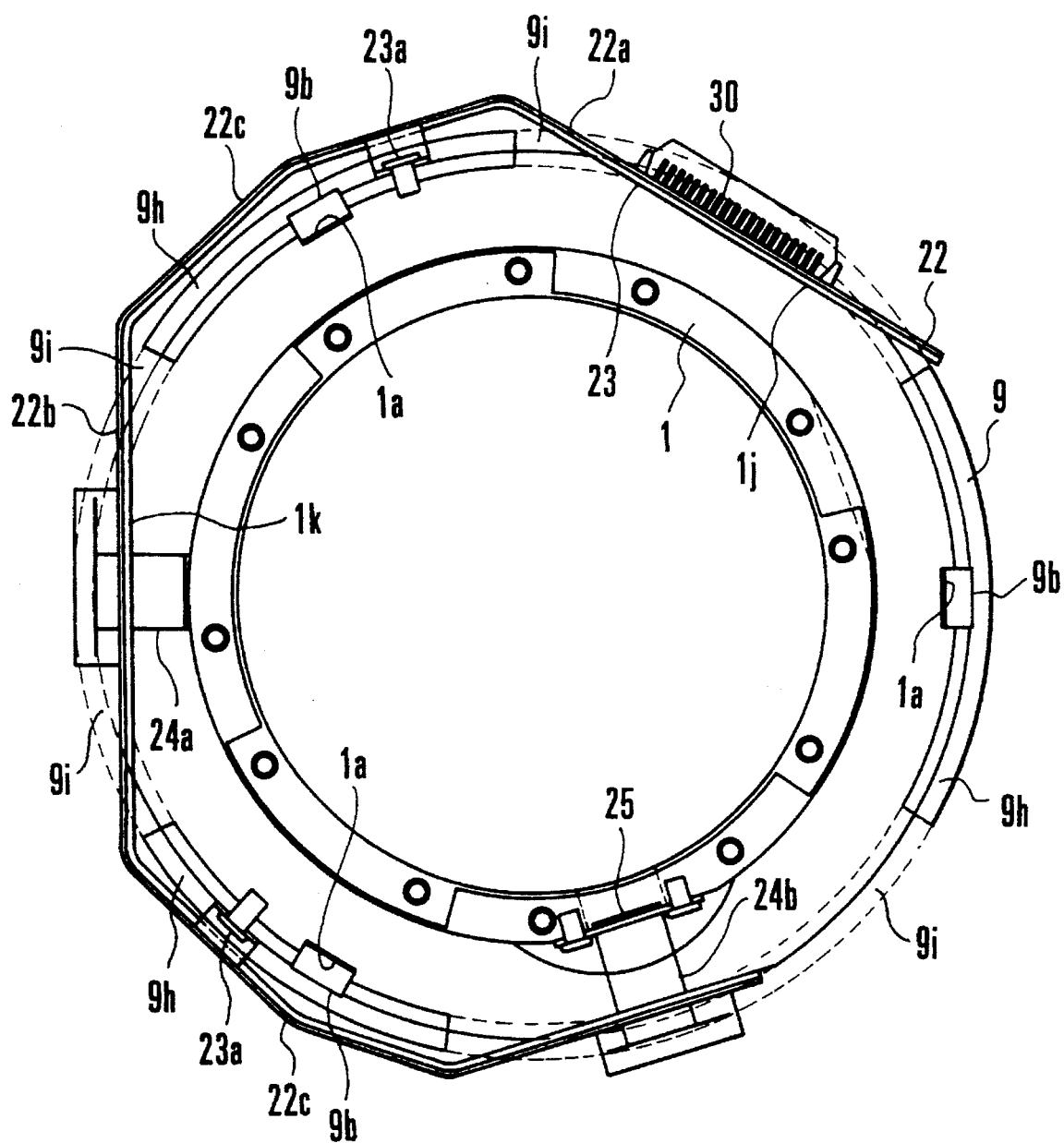
FIG. 9 is a transverse sectional view showing the arrangement of a fixed tube and mounted parts of the embodiment of this invention.
Figure 10:
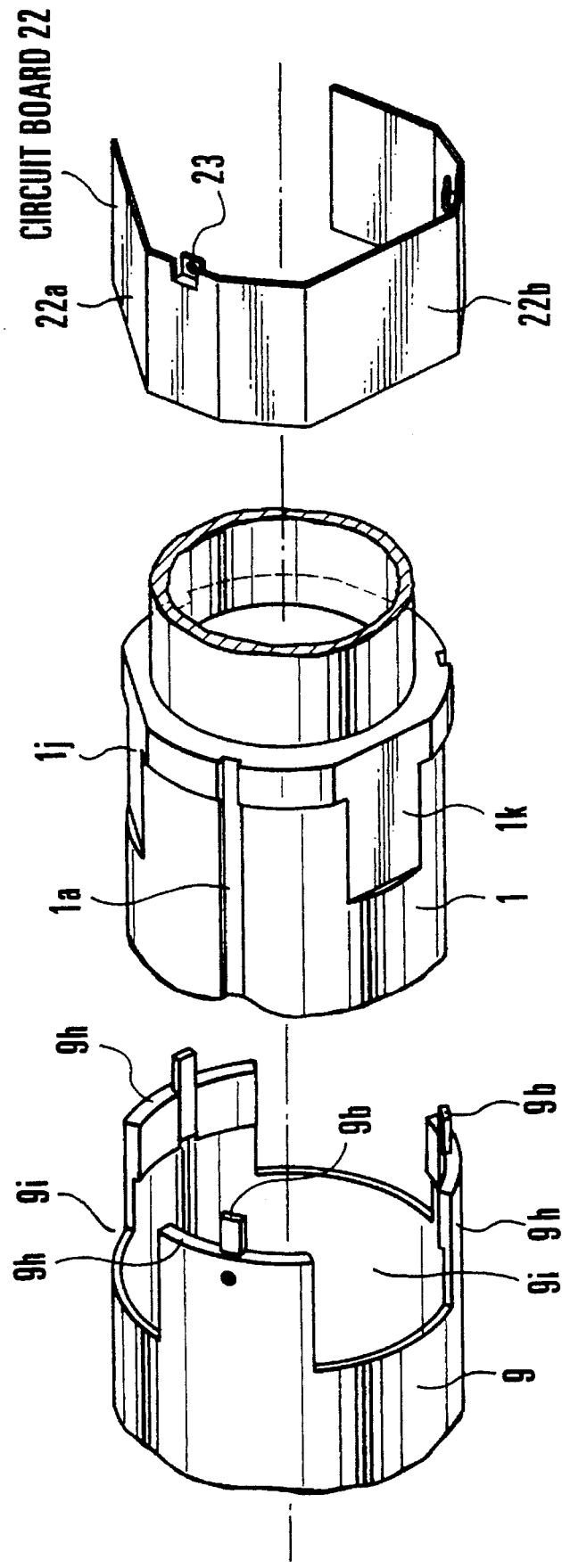
FIG. 10 is an oblique view showing the arrangement of mounted parts of the embodiment of this invention.

An embodiment of this invention is arranged as shown in FIGS. 1 to 10. FIG. 1 is a sectional view showing a telephoto end state of a lens barrel which is arranged as the embodiment. FIG. 2 is a sectional view showing a wide-angle end state of the same lens barrel. FIG. 3 is a development view of a cam tube. FIG. 4 is a development view of a first-lens-group tube. FIG. 5 is a development view of a cam tube for a hood. FIG. 6 is a diagram showing the zooming movement of each lens group. FIG. 7 is a detailed view of a focus interlocking tube and other parts arranged around it. FIG. 8 is a sectional view of the arrangement of a filter frame mounting part. FIG. 9 is a transverse sectional view of the arrangement of mounted parts. FIG. 10 is an oblique view of essential parts showing the arrangement of the mounted parts.

Referring to FIGS. 1 to 10, the lens barrel carries a first lens group I, a second lens group II, a third lens group III, a fourth lens group IV, a fifth lens group V and a sixth lens group VI. In FIG. 1, reference symbol A denotes a filter which is detachably attached to the lens barrel.

In these figures, reference numeral 1 denotes a fixed tube. The fixed tube 1 has three outer rectilinear grooves 1a, three inner rectilinear grooves 1b and three second-lens-group holding holes 1c. A small diameter part 1h of the fixed tube 1 is provided with a circumferential hole 1i.

Reference numeral 2 denotes a mount. The mount 2 is secured to the fixed tube 1 with screws 2a and is arranged to hold a back cover 3. A stopper pin 2b for mounting and demounting is provided on the mount 2.

The fixed tube 1 has a large diameter part 1e. The large diameter part 1e has a distance window part 4. A stepped part 1f and a fitting engagement part 1g are formed inside the peripheral part of the large diameter part 1e. A rotary tube 5 is rotatably carried at the stepped part 1f and the fitting engagement part 1g.

Pins 5a are screwed into the fore end of the rotary tube 5 from outside at two opposite points. Three protruding parts 5b protrude toward a rear end inner circumferential part of the rotary tube 5. Rereference numeral 6 denotes a focusing unit. A body 6a of the focusing unit 6 is secured to the fixed tube 1 with screws 6b. Reference numeral 6c denotes a known ultrasonic motor.

Reference numeral 6d denotes an output member. Roller members 6e are rotatably carried by shaft screws 6f at three evenly spaced parts of the outer circumference of a roller ring 6g. The roller ring 6g is fitted in the body 6a of the focusing unit 6 on its inner diameter side in such a way as to be rotatably carried by the body 6a of the focusing unit 6. A distance graduation 6i is provided along the outer circumference of the roller ring 6g.

An intermediate member 6h is fitted in and held by the body 6a of the focusing unit 6. The intermediate member 6h has three fitting longitudinal groove parts 6j on its outer circumferential side and is arranged to be rotatable together with the above-stated rotary tube 5 with the protruding parts 5b which are formed on the rear end inner circumferential part of the rotary tube 5 fitted into the fitting longitudinal groove parts 6j.

A pressing member 6k which is provided for pressing the ultrasonic motor 6c is arranged within the body 6a of the focusing unit 6 to press the ultrasonic motor 6c, the output member 6d, the roller members 6e and the intermediate member 6h in turn at the same time.

A focus key 7 is secured with a screw 7a to the roller ring 6g within the focusing unit 6. The focus key 7 has a fitting longitudinal groove part 7b. A focus interlocking tube 8 is fitted into the fixed tube 1 and, as shown in FIG. 7, is provided with a longitudinal groove 8b formed in its inner circumferential face. A pin 8a is screwed into the outer circumferential face of the focus interlocking tube 8 and is arranged to have its thrust restricted by the circumferential hole 1i of the small diameter part 1h of the fixed tube 1 and to have its rotation restricted by the fitting longitudinal groove part 7b of the above-stated focus key 7.

A first-lens-group tube 9 is arranged to carry the first lens group I and to fittingly engage the fixed tube 1 at its fitting engagement part 9a which is located at the rear end inner part of the first-lens-group tube 9. Three rectilinear keys 9b are secured to the rear end inner part of the first-lens-group tube 9 with screws 9c as shown in FIG. 4. The first-lens-group tube 9 is carried in such a way as to be rectilinearly movable relative to the fixed tube 1 with the three rectilinear keys 9b respectively fitted into the three rectilinear grooves 1a formed in the outer side of the fixed tube 1.

Three cam slots 9d are formed and evenly spaced in the front half part of the first-lens-group tube 9. A peripheral fitting part of the first-lens-group tube 9 fittingly engages and carries a cam tube 10 which is provided for a hood. The first-lens-group tube 9 is thus arranged to carry the cam tube 10 for the hood in such a way as to allow the cam tube 10 to rotate in a set position relative to the first-lens-group tube 9 by restricting the thrust of the cam tube 10. Three dowels 9e are evenly spaced and disposed on the front peripheral part of the first-lens-group tube 9. A flange part 9f extends from the first-lens-group tube 9 toward its outer circumferential side. The flange part 9f has a fitting engagement part 9g which is formed in the peripheral part of the flange part 9f.

As shown in FIG. 5, the cam tube 10 for the hood is provided with three rectilinear slots 10a and three V-shaped cam grooves 10b.

An operation ring 11 has a fitting engagement receiving part 11a which is formed in the middle part on the inner side of the operation ring 11. The fitting engagement receiving part 11a is arranged to fittingly engage the fitting engagement part 9g of the flange part 9f extending toward the outer circumferential side of the first-lens-group tube 9, to restrict the thrust of the first-lens-group tube 9. The first-lens-group tube 9 thus can be moved back and forth by the operation ring 11.

Further, longitudinal grooves 11b are formed in two opposite parts on the inner side of the operation ring 11. The two longitudinal grooves 11b fittingly engage two pins 5a which are screwed from outside into the fore end of the rotary tube 5. By virtue of this fitting engagement, the operating force of the operation ring 11 can be always stably transmitted through the rotary tube 5 to the intermediate member 6h included in the focusing unit 6 even when the operation ring 11 is moved back and forth by a rotational operation performed on the operation ring 11.

A filter frame 12 is provided with a filter thread 12a in its fore end inner circumferential part for screwing a filter A into the filter frame 12. The filter frame 12 is provided further with a fitting engagement part 12b in its rear end inner circumferential part. The fitting engagement part 12b has three holes 12e which are evenly spaced and arranged to have three steel balls 20 fitted therein. The steel balls 20 are respectively urged toward the V-shaped cam grooves 10b of the cam tube 10 for the hood by a leaf spring 21 which is attached to the filter frame 12 with a screw 21a.

The filter frame 12 is provided further with three evenly spaced longitudinal grooves 12d which are formed in an intermediate part on the inner side of the filter frame 12. The longitudinal grooves 12d are fitted on the dowels 9e provided on the front peripheral part of the first-lens-group tube 9. A fitting engagement part 12b which is located in the rear end inner circumferential part of the filter frame 12 is fitted on the periphery of the cam tube 10 for the hood. Since the holes 12e which are evenly spaced inside the fitting engagement part 12b and the steel balls 20 which are urged toward the cam tube 10 for the hood are engaging the V-shaped cam grooves 10b formed in the cam tube 10 for the hood on the inner side of this fitting engagement part 12b, the filter frame 12 is rectilinearly drawn out relative to the first lens group I carried by the first-lens-group tube 9 when the cam tube 10 for the hood is rotated.

Referring to FIG. 3, a cam tube 13 has a large diameter part 13a. The large diameter part 13a is fitted into the inner side of the fixed tube 1 to be carried by the fixed tube 1. Further, the large diameter part 13a is provided with three fixed-pin cams 13c, three third-lens-group cams 13d, three fourth-lens-group cams 13e and three fifth-lens-group cams 13f, which are evenly spaced thereon. A small diameter part 13b of the cam tube 13 is provided with a focus cam 13g. The diameter of the cam tube 13 is increased by one step for its front end peripheral part. A fitting engagement part 13h is arranged at the front end peripheral part of the cam tube 13 to have fitting engagement pins 13i screwed into three parts which are evenly spaced.

The fitting engagement pins 13i engage the cam slots 9d of the first-lens-group tube 9 by piercing them and, at the same time, engage the rectilinear slots 10a of the cam tube 10 for the hood. Therefore, the amount of rotation of the cam tube 13 restricts the amount of rotation of the cam tube 10 for the hood and thus determines the drawn-out amount of the filter frame 12.

A second-lens-group tube 14 carries the second lens group II and has a fitting engagement part 14a on its periphery. The fitting engagement part 14a has three fixed pins 14b which are evenly spaced. The three fixed pins 14b on the fitting engagement part 14a respectively engage three fixed-pin cams 13c which are formed in the large diameter part 13a of the cam tube 13 and, at the same time, also engage the second-lens-group holding holes 1c provided in the fixed tube 1. The second-lens-group tube 14 is, therefore, stationary relative to the fixed tube 1.

The rotating position and the thrust position of the cam tube 13 are determined by two position determining factors including the shapes of the fixed-pin cams 13c formed in the large diameter part 13a of the cam tube 13 and the shapes of the cam slots 9d formed in the front half of the first-lens-group tube 9. The cam tube 13 can be drawn out, with a rotational motion, from its wide-angle end state (position) shown in FIG. 2 to its telephoto end state (position) shown in FIG. 1 by moving the operation ring 11 forward.

A moving diaphragm 13j is secured to the fore end face of the cam tube 13. A fifth-lens-group tube 15 carries the fifth lens group V and has a fitting engagement part 15a. The fifth-lens-group tube 15 is thus arranged to be carried by the cam tube 13 with the fitting engagement part 15a engaging the large diameter part 13a of the cam tube 13. Further, the fifth-lens-group tube 15 is provided with three fifth-lens-group pins 15b which are screwed into the fitting engagement part 15a, three third-lens-group slots 15c and three fourth-lens-group slots 15d, which are evenly spaced. Since the fifth-lens-group pins 15b which are screwed into the fitting engagement part 15a are engaging the fifth-lens-group cams 13f formed in the large diameter part 13a of the cam tube 13 and are also engaging, at the same time, the rectilinear grooves 1b provided in the inner face of the fixed tube 1, the fifth-lens-group tube 15 is movable for zooming as desired by the rotational drawing-out action of the cam tube 13.

Reference numeral 16 denotes a known electromagnetic diaphragm unit.

A third-lens-group tube 17 is arranged to carry the third lens group III and the electromagnetic diaphragm unit 16. The third-lens-group tube 17 fittingly engages the above-stated fifth-lens-group tube 15 to be carried thereby. Third-lens-group pins 17a which are screwed into the fitting engagement face of the third-lens-group tube 17 engage the third-lens-group slots 15c provided in the fitting engagement part 15a of the fifth-lens-group tube 15 and, at the same time, also engage third-lens-group cams 13d which are formed in the large diameter part 13a of the cam tube 13. This arrangement enables zooming to be carried out as desired by rectilinearly moving the third-lens-group tube 17 through the rotational drawing-out action of the cam tube 13.

A fourth-lens-group tube 18 carries the fourth lens group IV and fittingly engages the fifth-lens-group tube 15 to be carried thereby. Fourth-lens-group pins 18a are screwed into the fitting engagement face of the fourth-lens-group tube 18. The fourth-lens-group pins 18a engage the fourth-lens-group slots 15d which are formed in the fitting engagement part 15a of the fifth-lens-group tube 15 and, at the same time, also engage the fourth-lens-group cams 13e which are formed in the large diameter part 13a of the cam tube 13. Therefore, the fourth-lens-group tube 18 is movable at the same time as the third-lens-group tube 17 for zooming as desired by the rotational drawing-out action of the cam tube 13.

A sixth-lens-group tube 19 carries the sixth lens group VI and fittingly engages the inner face of the small diameter part 13b of the cam tube 13 to be carried thereby. A sixth-lens-group pin 19a is screwed into the fitting engagement part of the sixth-lens-group tube 19. The sixth-lens-group pin 19a engages the focus cam 13g formed in the small diameter part 13b of the cam tube 13 and also engages the longitudinal groove 8b formed in the inner circumferential face of the focus interlocking tube 8 mentioned in the foregoing. The sixth-lens-group tube 19 is thus positioned through the sixth-lens-group pin 19a.

A main mounting circuit board 22 is arranged to drive and control the ultrasonic motor 6c disposed within the focusing unit 6 and a motor disposed within the electromagnetic diaphragm unit 16. Flexible printed circuit boards 24a and 24b are provided for electric wiring between the main mounting circuit board 22 and the focusing unit 6 and the electromagnetic diaphragm unit 16. A guide member 25 is provided for stabilizing the electric wiring with a curved part 24c of the flexible printed circuit board 24b being shifted relative to the electromagnetic diaphragm unit 16 which is moved by zooming.

As shown in FIGS. 9 and 10, a circuit board carrying base 23 is secured to the upper surface of the fixed tube 1 with screws 23a. The main mounting circuit board 22 is attached to the upper surface of the circuit board carrying base 23. The main mounting circuit board 22 is carried by the circuit board carrying base 23 approximately in a polygonal shape, including flat surface parts 22a and 22b which are located on the flat surface parts 1j and 1k formed on the outer circumference of the fixed tube 1. Main electric elements 30 such as a CPU, resistors, capacitors, connectors, etc., are arranged on these flat surface parts 22a and 22b.

Further, each connection part 22c of the main mounting circuit board 22 is provided mainly with a pattern and a check pad. At the time of zooming, the protruding parts 9h of the first-lens-group tube 9 which is movable over the outside of the fixed tube 1 are moved on the inner side of the connection part 22c. The protruding parts 9h are then allowed to be inserted to a large extent in between the fixed tube 1 and the main mounting circuit board 22 when the lens barrel is shifted to the wide-angle end position. The circuit board carrying base 23 is thus arranged to secure a sufficient void space between the main mounting circuit board 22 and the fixed tube 1 during the movement of the protruding parts 9h of the first-lens-group tube 9.

Further, the first-lens-group tube 9 is provided with cutout parts 9i in positions corresponding to the flat surface parts 1j and 1k of the fixed tube 1. The movement of the first-lens-group tube 9 in the direction of the optical axis is, therefore, possible even when the circuit board carrying base 23 (the main mounting circuit board 22) is allowed to come into close contact with the flat surface parts 1j and 1k of the fixed tube 1.

The rectilinear keys 9b which are arranged, as mentioned in the foregoing, to fittingly engage the outer rectilinear grooves 1a formed in the outer surface of the fixed tube 1 are attached to the protruding parts 9h serving as the fitting engagement surfaces. Therefore, the length of fitting engagement in the direction of the optical axis can be arranged to be long, so that the possibility of rattling can be minimized in accordance with this structural arrangement.

In such a structural arrangement, when the operation ring 11 is pulled out from a wide-angle end position to a telephoto end position for a zooming operation, the first-lens-group tube 9 rectilinearly moves to the same amount as the pulled-out amount of the operation ring 11. At the same time, the cam tube 13 performs a rotational drawing-out action. The rotational drawing-out action of the cam tube 13 causes the fifth-lens-group tube 15 to move rectilinearly.

Then, at the same time, the third-lens-group tube 17 and the fourth-lens-group tube 18 also concurrently come to rectilinearly move.

Since the fitting engagement pins 13i which are provided on the cam tube 13 engage the rectilinear grooves 10a formed in the cam tube 10 for the hood, the cam tube 10 for the hood comes to rotate in its set position relative to the first-lens-group tube 9. As a result, the filter frame 12 comes to rectilinearly move according to the zooming operation as the steel balls 20 which are urged by the leaf spring 21 engage the V-shaped grooves 10b formed in the cam tube 10 for the hood.

The sixth-lens-group tube 19, the rotation of which is restricted by the longitudinal groove 8b of the focus interlocking tube 8 connected to the focus key 7 in the state of fixing focus, as mentioned in the foregoing, comes to rectilinearly move in this instance.

In a case where an external force is applied to the filter frame 12 after it is drawn out by the zooming operation, the embodiment acts as described below with reference to FIG. 8.

Referring to FIG. 8, if the external force is applied from the front of the filter frame 12, the steel balls 20 override the V-shaped cam grooves 10b of the cam tube 10 for the hood against an urging force of the leaf spring 21. The filter frame 12 then becomes movable in the direction of the optical axis.

When a sudden external force is applied from the front side of the lens barrel, the arrangement mentioned above enables the filter frame 12 to retreat rearward, so that the filter frame 12 can be prevented from being deformed or damaged. Even with the steel balls 20 disengaged from the V-shaped cam grooves 10b, the steel balls 20 can be caused to fall again into the V-shaped cam grooves 10b by an operation on the operation ring 11 or by pulling out the film frame 12 a little by hand, because the steel balls 20 move along with the filter frame 12 within holes 12e while being urged by the leaf spring 21 toward the cam tube 10 for the hood. Therefore, after that, the filter frame 12 comes to rectilinearly move according to the zooming operation.

In a case where a filter frame which serves also as a light shielding tube is employed as the above-stated moving tube, the filter frame can be used in a state of being retracted rearward by pushing the filter frame from its front side if the light shielding function is unnecessary or the filter frame is unable to be pulled out due to an obstacle in front of the lens barrel.

Figure 11:
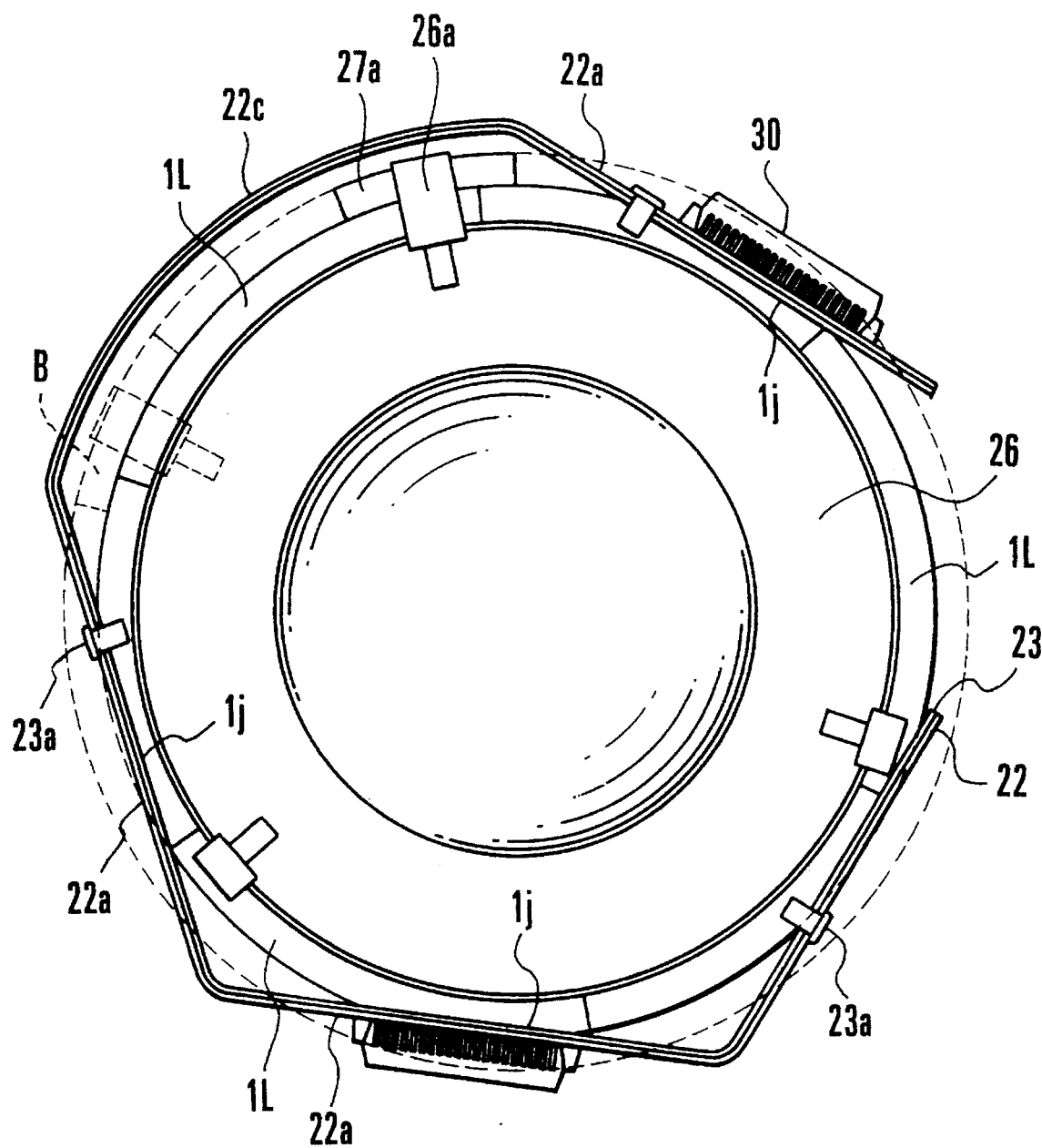
FIG. 11 is a transverse sectional view showing the arrangement of mounted parts of another embodiment of this invention.
Figure 12:
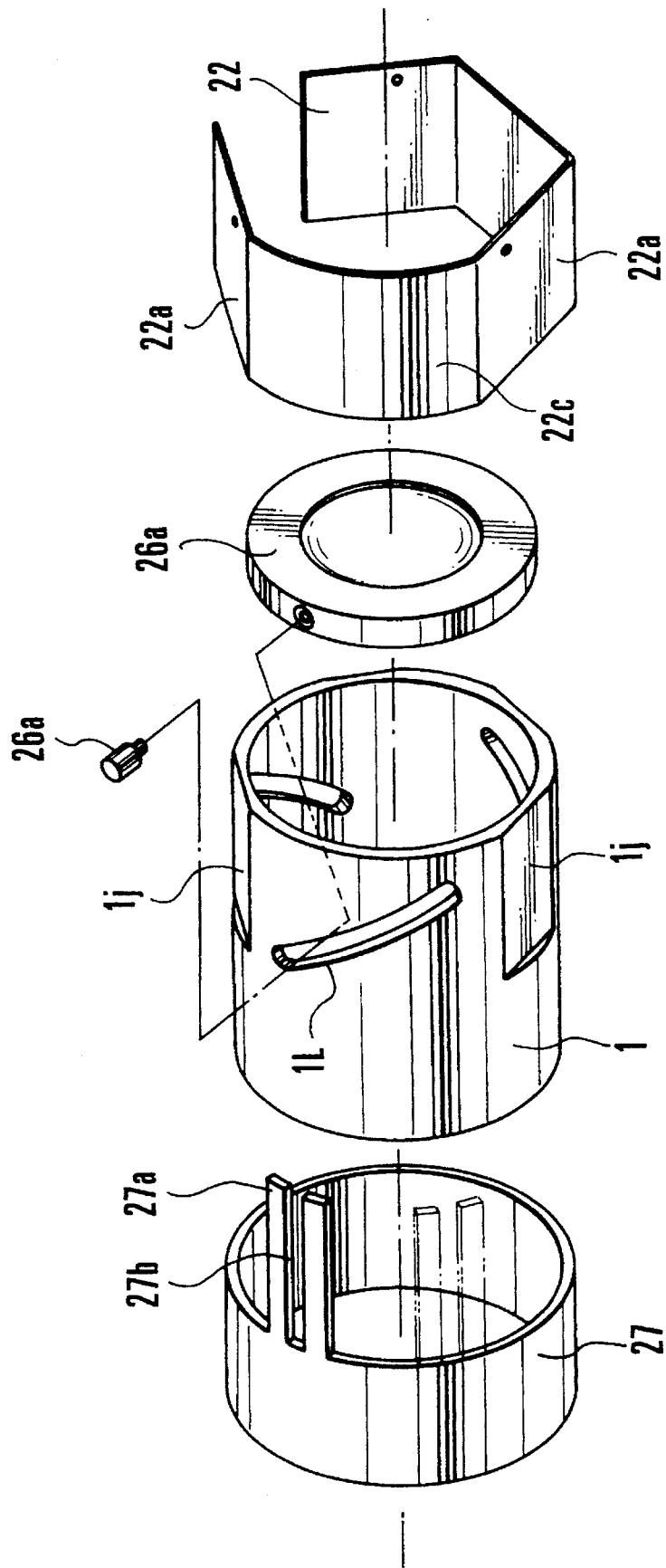
FIG. 12 is an exploded oblique view showing the essential parts of the embodiment shown in FIG. 11.

Another (second) embodiment of this invention is described with reference to FIGS. 11 and 12 as follows: FIG. 11 is a transverse sectional view showing the arrangement of mounted parts in the second embodiment. FIG. 12 is an exploded oblique view showing the essential parts of the embodiment. In FIGS. 11 and 12, reference numeral 1 denotes a fixed tube which has flat surface parts 1j. Reference numeral 22 denotes a main mounting circuit board. Reference numeral 23 denotes a circuit board carrying base which has the main mounting circuit board 22 stuck to its surface. The circuit board carrying base 23 is secured to the fixed tube 1 with screws 23a in such a way as to have the flat surface parts 22a of the main mounting circuit board 22 in positions corresponding to the flat surface parts 1j of the fixed tube 1.

Reference numeral 27 denotes a rotary tube. In the first embodiment described in the foregoing, the first-lens-group tube 9 which serves as a moving tube is arranged to rectilinearly move beneath the inner side of the main mounting circuit board 22 in the direction of the optical axis. In the case of the second embodiment, the rotary tube 27 is arranged to rotate in a set position. The rotary tube 27 is connected to a driving member such as a motor or the like which is not shown. The rotary tube 27 is provided with a protruding part 27a which has a key way part 27b formed therein.

A pin 26a which is provided on a moving tube 26 for focusing engages the key way part 27b. The pin 26a also engages a cam slot 1L formed in the fixed tube 1. The arrangement is such that focus adjustment is made when the moving tube 26 is caused to move in the direction of the optical axis by the rotation of the rotary tube 27.

In adjusting focus, the protruding part 27a of the rotary tube 27 rotates along the inner side of a connection part 22c of the main mounting circuit board 22 to a position B which is indicated by a broken line in FIG. 11. In this instance, the circuit board carrying base 23 serves to hold the shape of the main mounting circuit board 22 and secures a sufficient void space to allow the protruding part 27a of the rotary tube 27 to rotate without any interference with the main mounting circuit board 22.

In accordance with the embodiments described above, the lens barrel comprises a moving tube arranged to move outside a fixed tube, a mounting circuit board disposed outside the moving tube and having a flat surface part fixed to the fixed tube and located at a position extending from the outside to the inside of the moving tube, and mounted parts disposed on the flat surface part of the mounting circuit board, wherein, when the moving tube is moved, a part of the moving tube is inserted in between the fixed tube and the mounting circuit board. Therefore, the moving tube can be arranged near the mounted parts without increasing the size of the lens barrel, so that the lens barrel can be compactly arranged at a low cost.

Further, the lens barrel comprises a moving tube arranged to move relative to the fixed tube, an operation member interlocked with the moving tube to cause the moving tube to move, and urging means for keeping the moving tube in a predetermined position, wherein, when an external force happens to counteract the urging force of the urging means, the moving tube can be moved to a position other than the predetermined position within a movable range. This arrangement effectively prevents the moving tube and a structural arrangement for holding the moving tube from being damaged even in the event of sudden application of an external force due to an incorrect operation by the operator, so that the stable performance of the lens barrel can be retained for a long period of time.

What is claimed is:

1. A lens barrel, comprising:

a) a fixed tube;

b) a moving tube arranged to move over an outer circumference of said fixed tube in a direction of an optical axis, said moving tube having a cutout part; and c) a band-like circuit board disposed around the optical axis on an outer diameter side of said fixed tube, said circuit board having a part located at a position within an area corresponding to the cutout part of said moving tube and which would be on an inner diameter side of said moving tube if said moving tube were continued through said cutout part, and said circuit board having a part located on an outer diameter side of said moving tube within an area other than the area corresponding to the cutout part.

2. A lens barrel according to claim 1, wherein said moving tube is provided with a plurality of cutout parts arranged in a circumferential direction thereof.

3. A lens barrel according to claim 1, wherein said fixed tube has a flat surface part formed on an outer circumference thereof in an area corresponding to the cutout part of said moving tube, wherein said circuit board also has a flat surface part, and wherein said circuit board is disposed such that the flat surface part of said circuit board overlaps the flat surface part of said fixed tube in a radial direction thereof.

4. A lens barrel according to claim 3, wherein a chip-like electric element is mounted on an outer diameter side of the flat surface part of said circuit board.

5. A lens barrel according to claim 3, wherein said circuit board is fixed to the flat surface part of said fixed tube.

6. A lens barrel according to claim 1, wherein said circuit board is formed approximately in a polygonal shape including a plurality of flat surface parts, wherein said moving tube has a plurality of cutout parts formed in a circumferential direction thereof, wherein said fixed tube has a plurality of flat surface parts formed on an outer circumference thereof in areas corresponding to the plurality of cutout parts, and wherein said circuit board is disposed such that the plurality of flat surface parts of said circuit board overlap the plurality of flat surface parts of said fixed tube in a radial direction thereof.

7. A lens barrel according to claim 1, wherein said moving tube is arranged to be movable only in the direction of the optical axis.

8. A lens barrel according to claim 1, wherein said circuit board is fixed to said fixed tube at a position corresponding to the cutout part of said moving tube.

9. A lens barrel comprising:

a) a first tubular member;

b) a second tubular member disposed on an outer diameter side of said first tubular member and having a cutout part, said first tubular member and said second tubular member being arranged to be displaceable relative to each other in a direction of an optical axis; and c) a circuit board of an approximately band-like shape disposed around an optical axis on an outer diameter side of said first tubular member, said circuit board having a part located at a position within an area corresponding to the cutout part of said second tubular member and which would be on an inner diameter side of said second tubular member if said second tubular member were continued through said cutout part, and said circuit board having a part located on an outer diameter side of said second tubular member within an area other than the area corresponding to the cutout part.

10. A lens barrel according to claim 9, wherein said first tubular member is stationary, and wherein said second tubular member is arranged to be movable only in the direction of the optical axis.

11. A lens barrel according to claim 9, wherein said second tubular member has a plurality of cutout parts arranged in a circumferential direction thereof.

12. A lens barrel according to claim 9, wherein said first tubular member has a flat surface part formed on the outer circumference thereof in an area corresponding to the cutout part of said second tubular member, wherein said circuit board also has a flat surface part, and wherein said circuit board is disposed such that the flat surface part of said circuit board overlaps the flat surface part of said first tubular member in a radial direction thereof.

13. A lens barrel according to claim 9, wherein said circuit board is formed approximately in a polygonal shape including a plurality of flat surface parts, wherein said second tubular member has a plurality of cutout parts formed in a circumferential direction thereof, wherein said first tubular member has a plurality of flat surface parts formed on an outer circumference thereof in areas corresponding to the plurality of cutout parts, and wherein said circuit board is disposed such that the plurality of flat surface parts of said circuit board overlap the plurality of flat surface parts of said first tubular member in a radial direction thereof.

14. A lens barrel according to claim 9, wherein said circuit board is fixed to said first tubular member at a position corresponding to the cutout part of said second tubular member.

15. A lens barrel comprising:

a) a first tubular member;

b) a second tubular member having a cutout part disposed on an outer diameter side of said first tubular member, said first and second tubular members being arranged to be movable relative to each other; and c) a circuit mounting means having an approximately band-like shape, disposed around an optical axis on an outer diameter of said first tubular member, said circuit mounting means having a part located at a position within an area corresponding to the cutout part of said second tubular member and which would be on an inner diameter side of said second tubular member if said second tubular member were continued through said cutout part, and said circuit mounting means having a part located on an outer diameter side of said second tubular member within an area other than the area corresponding to the cutout part.

16. A lens barrel according to claim 15, wherein said first tubular member is stationary, and wherein said second tubular member is arranged to be movable only in the direction of the optical axis.

17. A camera having a lens barrel according to claim 16.

18. A lens barrel according to claim 15, wherein said second tubular member has a plurality of cutout parts arranged in a circumferential direction thereof.

19. A camera having a lens barrel according to claim 18.

20. A lens barrel according to claim 15, wherein said first tubular member has a flat surface part formed on an outer circumference thereof in such area corresponding to the cutout part of said second tubular member, wherein said circuit mounting means also has a flat surface part, and wherein said circuit mounting means is disposed such that the flat surface part of said circuit mounting means overlaps the flat surface part of said first tubular member in a radial direction thereof.

21. A camera having a lens barrel according to claim 20.

22. A lens barrel according to claim 15, wherein said circuit mounting means is formed approximately in a polygonal shape including a plurality of flat surface parts, wherein said second tubular member has a plurality of cutout parts formed in a circumferential direction thereof, wherein said first tubular member has a plurality of flat surface parts formed on an outer circumference thereof in areas corresponding to the plurality of cutout parts, and wherein said circuit mounting means is disposed such that the plurality of flat surface parts of said circuit mounting means overlap the plurality of flat surface parts of said first tubular member in a radial direction thereof.

23. A camera having a lens barrel according to claim 22.

24. A lens barrel according to claim 15, wherein said circuit mounting means is fixed to said first tubular member at a position corresponding to the cutout part of said second tubular member.

25. A lens barrel according to claim 15, wherein said first tubular member is fixed, and wherein said second tubular member is rotatable in a circumferential direction.

26. A camera having a lens barrel according to claim 25.

27. A camera having a lens barrel according to claim 15.

* * * * *